United States Patent
Wakazono et al.

(10) Patent No.: US 9,126,759 B2
(45) Date of Patent: Sep. 8, 2015

(54) TIRE CONVEYOR FOR A TIRE TESTING MACHINE

(71) Applicant: Kobe Steel, Ltd., Kobe-shi (JP)

(72) Inventors: Takehiko Wakazono, Takasago (JP); Munenori Soejima, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/173,055

(22) Filed: Feb. 5, 2014

(65) Prior Publication Data

US 2014/0251757 A1    Sep. 11, 2014

(30) Foreign Application Priority Data

Mar. 7, 2013    (JP) .................. 2013-044957

(51) Int. Cl.
  *B65G 47/244*    (2006.01)
  *B65G 13/02*    (2006.01)
  *G01M 17/02*    (2006.01)

(52) U.S. Cl.
  CPC ............. *B65G 13/02* (2013.01); *G01M 17/021* (2013.01)

(58) Field of Classification Search
  USPC .............. 198/406, 407, 409, 411, 410, 413, 198/463.3, 345, 456; 73/146
  See application file for complete search history.

(56) References Cited

U.S. PATENT DOCUMENTS 3,698,233 A * 10/1972 Braden et al. ................. 73/146
6,082,191 A * 7/2000 Neiferd et al. ................ 73/146
2013/0333615 A1  12/2013 Wakazono et al.

FOREIGN PATENT DOCUMENTS

JP    2012-220319    11/2012

* cited by examiner

*Primary Examiner* — Gene Crawford
*Assistant Examiner* — Lester Rushin
(74) *Attorney, Agent, or Firm* — Oblon, McClelland, Maier & Neustadt, L.L.P.

(57) ABSTRACT

A tire conveyor includes a roller portion provided at a position, in the width direction perpendicular to the conveying direction, without a conveying surface. The roller portion extends parallel to the conveying surface and is provided with a plurality of placement rollers forming a placement surface on which the tire is rotatably placed. An elevation mechanism includes a single actuator and a link mechanism connecting the roller portion or the conveyor to the actuator in a supported state and moves the placement surface of the roller portion upward and downward relative to the conveying surface by driving the actuator.

7 Claims, 10 Drawing Sheets

FIG. 11

TIRE CONVEYOR FOR A TIRE TESTING MACHINE

BACKGROUND OF THE INVENTION

1. Field of the Invention

The present invention relates to a tire conveyor that sends a tire to a tire testing machine.

2. Description of the Related Art

When a tire attached to an automobile or the like includes a portion having a non-uniform elastic modulus, a non-uniform dimension, or a non-uniform shape in the circumferential direction, the portion causes a vibration during the high-speed rotation of the tire, and hence degrades the running performance thereof. For this reason, the tire is subjected to a uniformity test in the circumferential direction by a tire testing machine after the tire is made by vulcanizing. Specifically, the tire testing machine fits a bead portion of the inner periphery of the tire into a rim member, attaches the tire to a rotating spindle, applies a predetermined pressure to the tire, rotationally drives a road surface substitution member such as a drum while the outer periphery of the tire is pressed against the road surface substitution member, and then performs a test. In general, a lubricant (lubrication solution) is applied to the tire in order to smoothly fit the bead portion of the test tire into the rim member.

As such a tire testing machine, there is known a tire testing machine that sends a test tire to a center position (rotary shaft) of a spindle through a tire conveyor. Then, there is known a tire testing machine equipped with a lubricator that applies a lubricant to a bead portion of an inner periphery of a tire on a tire conveyor until a test tire is sent to a center position of a spindle (for example, see JP 2012-220319 A). Like the disclosures, the spindle of the tire testing machine is disposed in the vertical direction, the tire is conveyed in a reclined state, and the reclined tire is sent to the center position of the spindle by the conveyor. Furthermore, there is also known a tire testing machine in which a spindle is disposed in the horizontal direction and a tire is attached to the spindle in a standing state.

Further, in the tire conveyor disclosed in JP 2012-220319 A, a roller portion and an arm member are provided in parallel at a position distant from the center of the spindle of the tire testing machine by a predetermined distance. Then, when the tire is conveyed to the position, a conveying surface of the conveyor is caused to descend in relation to the roller portion, the tire is rotated within the horizontal plane by the arm member while the tire is transferred to the roller portion, and a lubricant is applied to a bead portion of the inner periphery of the tire. Subsequently, the conveying surface of the conveyor is caused to ascend in relation to the roller portion, the tire is conveyed by a predetermined distance while the tire is transferred to the conveyor, and the tire is sent to the center position of the spindle of the tire testing machine.

SUMMARY OF THE INVENTION

Figure 11:
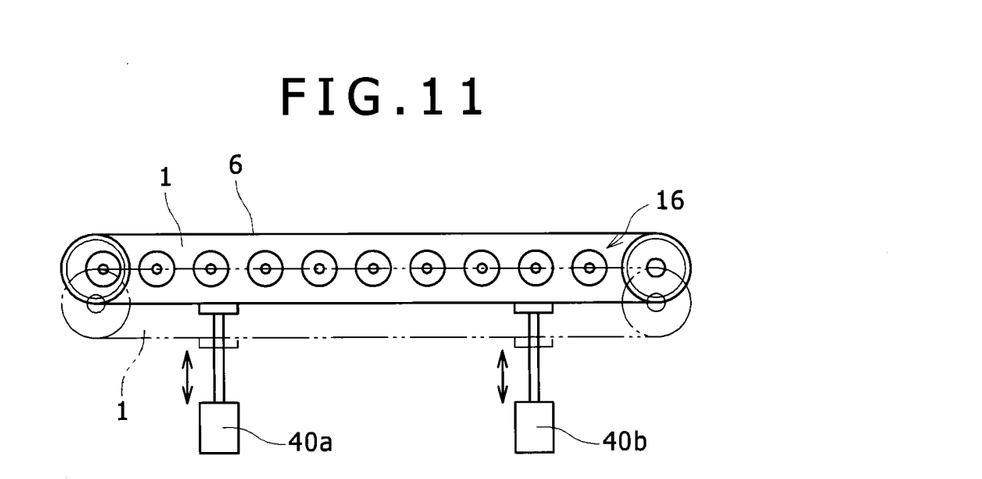
FIG. 11 is a cross-sectional view illustrating the relation among a tire conveyor according to the related art, a roller portion, and an elevation mechanism.

However, as illustrated in FIG. 11, in the tire conveyor disclosed in JP 2012-220319 A, two pneumatic cylinders (cylinders 40a and 40b) which are provided at the front and rear sides in the conveying direction are employed in order to elevate a conveying surface 6 of a conveyor 1 relative to a placement surface of a roller portion 16. For this reason, when the tire is transferred between the conveyor 1 and the roller portion 16 by the upward and downward movement of the conveyor 1 in a case where two pneumatic cylinders may not be synchronized, the movement may not be smoothly performed or the movement may not be performed in some cases.

Therefore, an object of the present invention is to provide a tire conveyor for a tire testing machine capable of stably transferring a tire between a conveyor and a roller portion.

In order to solve the above-described problems, according to the present invention, there is provided a tire conveyor that conveys a tire to a center position of a spindle in a tire testing machine equipped with the spindle used to attach a test tire thereto, the tire conveyor including: a roller portion; an elevation mechanism that moves a placement surface of the roller portion upward and downward relative to a conveying surface of the conveyor or moves the conveying surface of the conveyor upward and downward relative to the placement surface of the roller portion; a tire rotation member that rotates the tire placed on the roller portion; and a lubricator that applies a lubricant to a bead portion of the inner periphery of the tire rotated by the tire rotation member. The roller portion provided with a plurality of placement rollers is provided at a position without the conveying surface of the conveyor in the width direction perpendicular to the conveying direction of the conveyor in the conveying surface of the conveyor so as to be parallel to the conveying surface of the conveyor, and forms the placement surface on which the tire is rotatably placed. The elevation mechanism includes an actuator and a link mechanism that connects the roller portion or the conveyor to the actuator in a supported state. Only one actuator is provided at a portion that is movable upward and downward.

According to the above-described configuration, the elevation mechanism may move the placement surface of the roller portion upward and downward relative to the conveying surface of the conveyor or move the conveying surface of the conveyor upward and downward relative to the placement surface of the roller portion by driving only one actuator provided in one portion movable upward and downward. Thus, the roller portion or the conveyor is reliably and smoothly elevated without synchronizing the plurality of actuators, and hence the tire may be stably transferred between the conveyor and the roller portion.

Further, in the tire conveyor according to the present invention, the actuator may be an air cylinder.

Since the air cylinder is used as the actuator, the elevation mechanism may be realized simply at low cost.

According to the tire conveyor of the present invention, the tire may be stably transferred between the conveyor and the roller portion by reliably and smoothly realizing the elevation of the roller portion.

DESCRIPTION OF THE PREFERRED EMBODIMENTS

Hereinafter, embodiments of a tire conveyor according to the present invention for a tire testing machine will be described based on specific examples with reference to the drawings.

Furthermore, the description below is merely an example, and does not limit the application of the tire conveyor according to the present invention. That is, the tire conveyor according to the present invention is not limited to the embodiments below, and may be modified into various forms without departing from the scope of claims.

Figure 1:
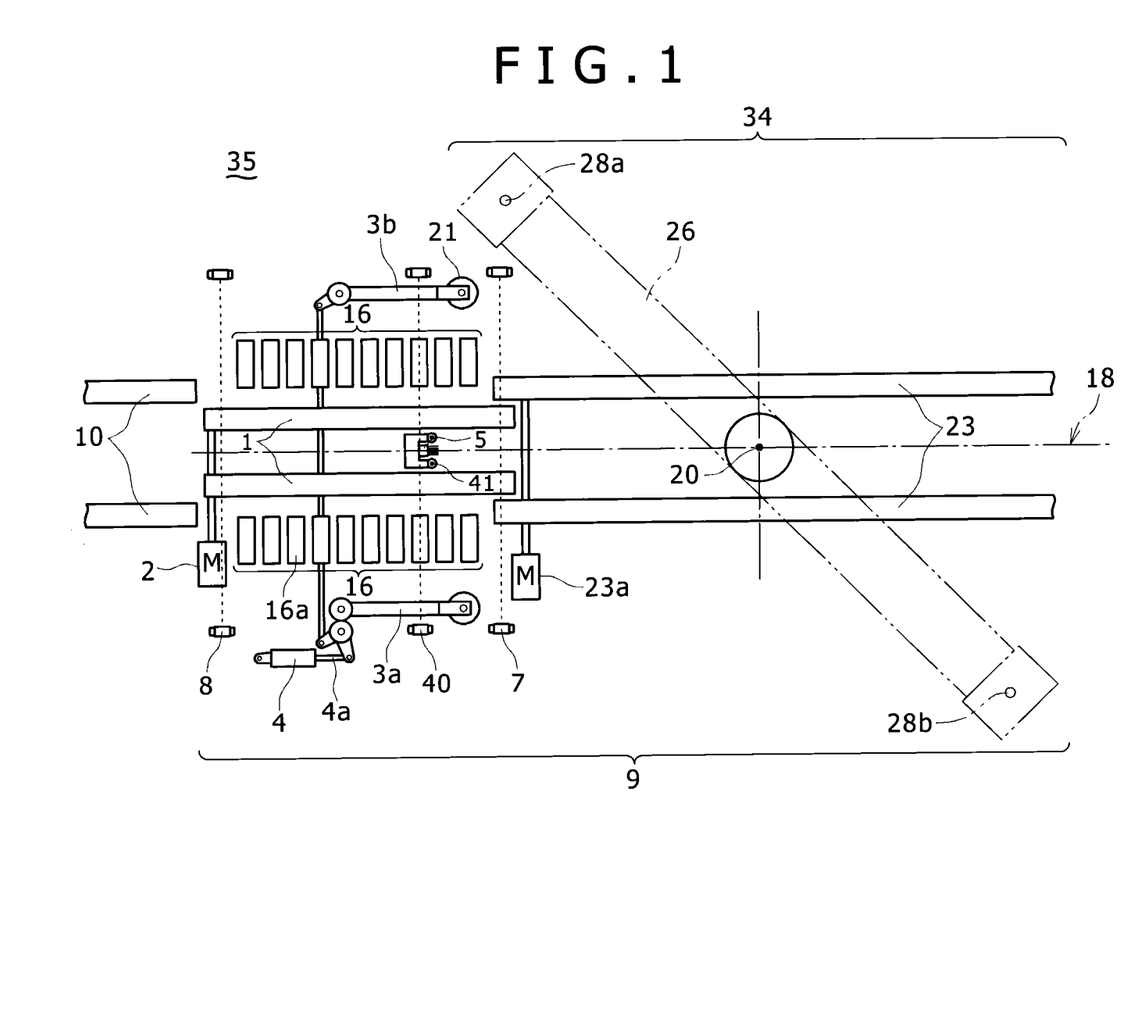
FIG. 1 is a top view illustrating a tire conveyor according to this embodiment.
Figure 2:
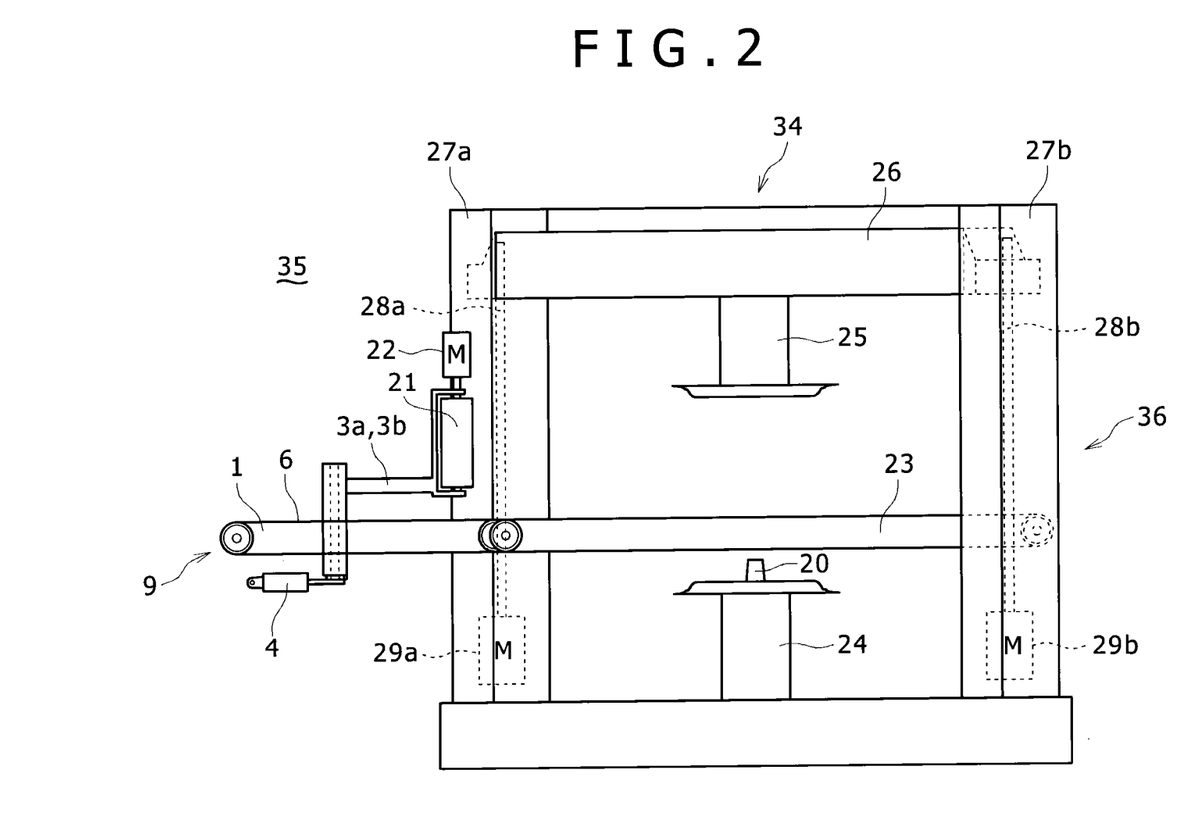
FIG. 2 is a cross-sectional view illustrating the tire conveyor according to this embodiment and taken along the line indicated by the reference numeral 18 illustrated in FIG. 1.
Figure 3:
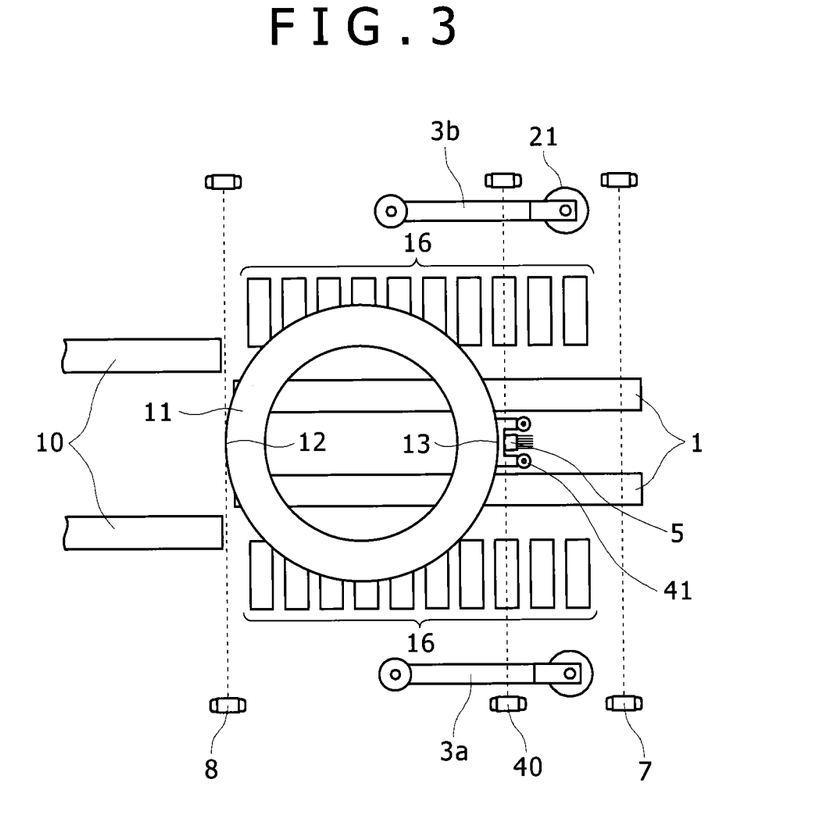
FIG. 3 is a top view illustrating a process in which a tire is conveyed by the tire conveyor according to this embodiment.

As illustrated in FIGS. 1 to 3, a tire conveyor 9 that is used in a tire testing machine 35 according to this embodiment includes an entrance conveyor 1 as a first belt conveyor that conveys a tire 11 conveyed and input from a customer conveyor 10 in a reclined state and a center conveyor 23 as a second belt conveyor that is connected to the downstream side of the entrance conveyor 1 and extends inside a test station 34.

One shaft of the entrance conveyor 1 is connected to a belt conveyor servo motor 2, and when the belt conveyor servo motor 2 is rotated, the entrance conveyor 1 may be driven. The customer conveyor 10 that supplies the tire 11 to be tested is connected to the upstream side of the entrance conveyor 1, and the upstream side of the entrance conveyor 1 is provided with a photoelectric sensor 8 that detects a rear end 12 (see FIG. 3) of the tire 11 conveyed toward the downstream side in the conveying direction. Further, the downstream side of the entrance conveyor 1 is provided with a photoelectric sensor 7 that detects a front end 13 (see FIG. 3) of the tire 11 conveyed to the center conveyor 23. Further, a photoelectric sensor 40 that detects the front end 13 of the tire 11 conveyed to the center conveyor 23 is provided at the slightly upstream side of the photoelectric sensor 7.

The center conveyor 23 sends the tire 11, which is received from the entrance conveyor 1, to the rotation center position (that is, a spindle shaft 20 of a bottom spindle 24) of a vertical spindle (the bottom spindle 24 and a top spindle 25) provided in the tire testing machine 35. One shaft of the center conveyor 23 is connected to a belt conveyor servo motor 23a, and when the belt conveyor servo motor 23a is rotated, the center conveyor 23 may be driven.

The entrance conveyor 1 and the center conveyor 23 are provided so as to partially include respective conveying surfaces in the width direction (a direction perpendicular to the conveying direction of the tire 11). Then, in the example illustrated in the drawings, each of the entrance conveyor 1 and the center conveyor 23 is configured as a pair of conveying belts so that the conveying surface is divided into two portions.

A lubricator 5 that is elevated by an air cylinder 14 (see FIG. 4) is provided between two entrance conveyors 1. As will be described later, the lubricator 5 includes a brush 5a that applies a lubricant (lubrication solution) to a bead portion 15 in the inner periphery of the tire 11.

A pair of arm members 3a and 3b having front ends directed to the downstream side is provided at both sides of the entrance conveyor 1 in the width direction at the center of the conveying direction. A pressing roller (tire rotation member) 21 that presses the outer peripheral surface of the rotating tire 11 toward the center side is attached to each of the pair of arm members 3a and 3b as will be described later, and the pressing rollers rotate inward and outward in the width direction in a bilaterally symmetrical manner by a link mechanism 4a and an air cylinder 4. As illustrated in FIG. 2, one or more pressing rollers 21 that are attached to the front ends of the pair of arm members 3a and 3b are adapted to be rotationally driven by a motor 22.

A pair of roller portions 16 is provided at both outer sides (predetermined positions) of the pair of conveying belts constituting the entrance conveyor 1. The roller portion 16 is configured as a plurality of placement rollers 16a provided on frames 16b. The placement rollers 16a include rotary shafts that are parallel to the width direction of the entrance conveyor 1 (a direction perpendicular to the conveying direction of the tire 11 of the entrance conveyor 1). Then, the roller portions 16 are parallel to the conveying surface of the entrance conveyor 1, and form a placement surface on which the reclined tire 11 is rotatably placed within the horizontal plane. Furthermore, as the predetermined positions where the roller portions 16 are provided, the positions may be located at the inside of the pair of conveying belts constituting the entrance conveyor 1 or both the inside between the pair of conveying belts and both outsides of the pair of conveying belts. The placement rollers 16a of the roller portions 16 form the placement surface on which the tire 11 is placed rotatably within the horizontal plane, and are formed in a manner such that a plurality of member rollers (not illustrated) are disposed on the outer peripheral surface thereof so as to rotate about a rotary shaft facing a direction perpendicular to the rotary shaft of the placement roller 16a as a main body.

Figure 10:
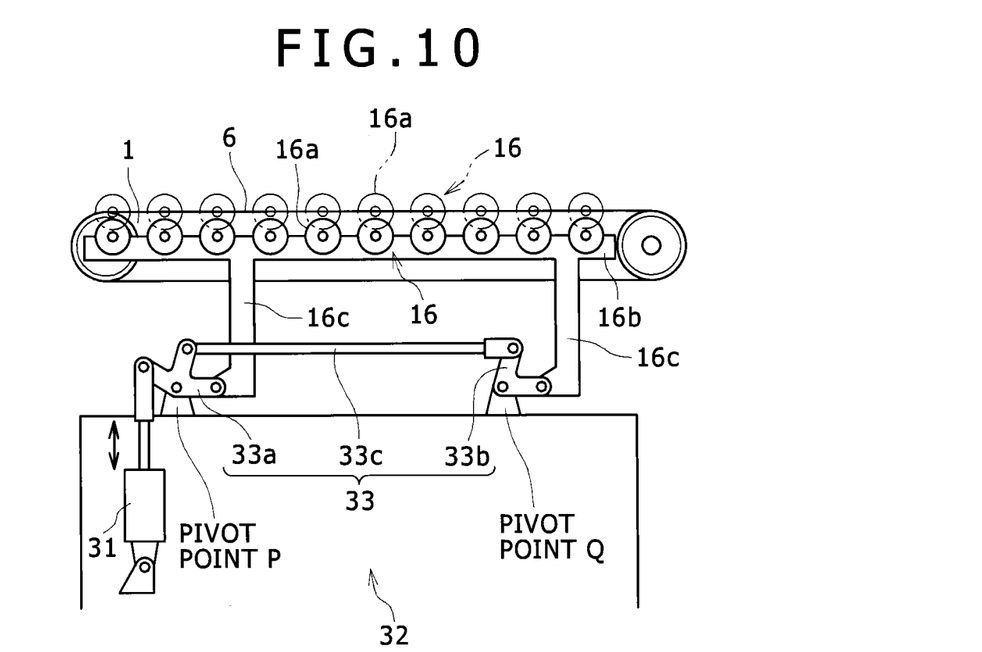
FIG. 10 is a cross-sectional view illustrating the relation among the tire conveyor according to this embodiment, the roller portion, and an elevation mechanism

As illustrated in FIG. 10, an elevation mechanism 32 includes an air cylinder (actuator) 31 and a link mechanism 33. Furthermore, an actuator other than the air cylinder 31 may be used in the elevation mechanism 32. When the air cylinder 31 is used as the actuator, the elevation mechanism 32 may be simply realized at low cost. The frames 16b that constitute the pair of roller portions 16 are respectively attached to and supported by the pair of link mechanisms 33. One air cylinder 31 is attached to the pair of link mechanisms 33. Then, the pair of frames 16b moves upward and downward along with the pair of link mechanisms 33 by the expansion and the contraction of the air cylinder 31. That is, the placement surfaces of the pair of roller portions 16 are elevated at the same time relative to the conveying surface of the entrance conveyor 1.

In the example of the elevation mechanism 32 of FIG. 10, a first rotary link 33a and a second rotary link 33b as the link mechanism 33 are respectively disposed at support portions 16c, which extend downward and provided at the front and rear sides of the entrance conveyor 1 in the conveying direction, so as to be respectively rotatable about a pivot point P and a pivot point Q in each of the pair of frames 16b. Further, the first rotary link 33a and the second rotary link 33b are connected to each other by a swing link 33c constituting the link mechanism 33 in a swingable manner. Further, one air cylinder 31 is connected to the first rotary link 33a that is disposed in each of the pair of frames 16b. Then, when the air cylinder 31 is driven (so as to be expanded and contracted) in the vertical direction, the first rotary link 33a disposed at each of the pair of frames 16b rotates about the pivot point P, and hence the swing link 33c moves in the vertical direction and the horizontal direction. Here, the second rotary link 33b rotates about the pivot point Q, and hence the support portions 16c that are provided at the front and rear sides of the pair of frames 16b in the conveying direction move linearly in the vertical direction. Furthermore, the elevation mechanism 32 is not limited to the configuration of FIG. 10, and various configurations may be employed.

As illustrated in FIGS. 1 and 2, the tire testing machine 35 includes the test station (test table) 34 with the bottom spindle 24 and the top spindle 25. Further, the test station 34 is provided with a chucking mechanism 36 that includes a slide beam 26, guide frames 27a and 27b, ball screws 28a and 28b, and motors 29a and 29b and chucks the tire 11 in a manner such that the bottom spindle 24 and the top spindle 25 are driven and the tire 11 to be tested is interposed between the bottom spindle 24 and the top spindle 25. That is, the chucking mechanism 36 drives the bottom spindle 24 and the top spindle 25 for the chucking operation. The top spindle 25 is attached to the slide beam 26. The slide beam 26 is laid across two guide frames 27a and 27b, and the ball screws 28a and 28b are attached to both sides thereof. The motors 29a and 29b are respectively attached to one side of the ball screws 28a and 28b, and the slide beam 26 is moved upward and downward when the ball screws 28a and 28b are driven in a synchronized manner. Further, the bottom spindle 24 includes the spindle shaft 20. Then, the tire 11 of which a tire shaft 17 (see FIG. 9) matches the spindle shaft 20 is interposed between the bottom spindle 24 and the top spindle 25 in a manner such that the ball screws 28a and 28b are driven to move the slide beam 26 upward and downward, and is conveyed to the test station 34.

Hereinafter, the procedure until the tire 11 is conveyed from the customer conveyor 10 to the test station 34 in the tire conveyor 9 according to this embodiment will be described with reference to FIGS. 3 to 10.

Figure 4:
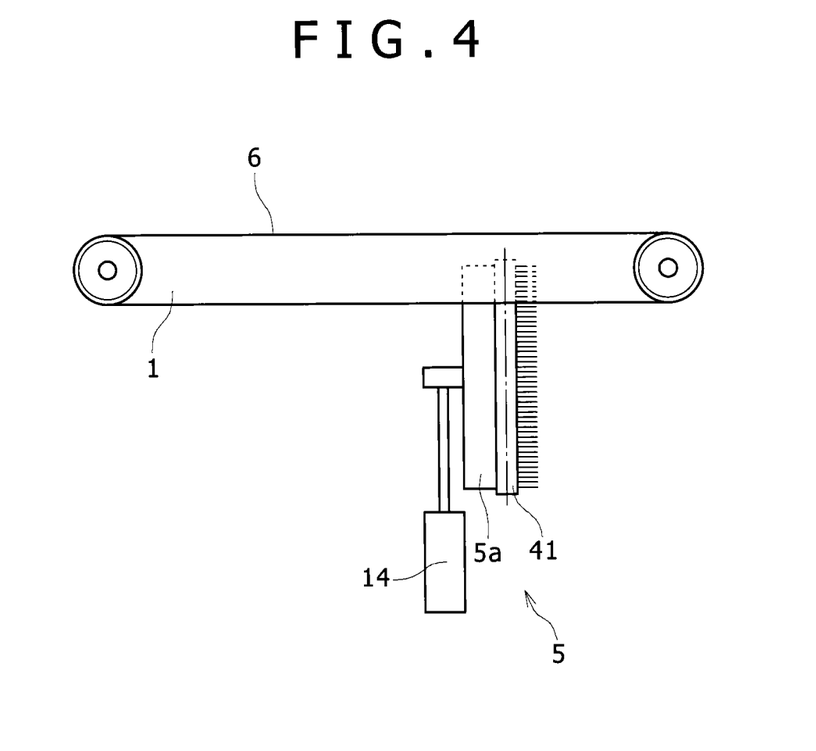
FIG. 4 is a side view illustrating the arrangement relation between the tire conveyor and a lubricator in the process of FIG. 3 in which the tire is conveyed by the tire conveyor according to this embodiment.

As illustrated in FIG. 4, when the tire 11 is input from the customer conveyor 10 to the entrance conveyor 1, the lubricator 5 descends in relation to the conveying surface 6 of the entrance conveyor 1. Furthermore, the descending of the lubricator 5 is performed by the air cylinder 14. Further, as indicated by the solid line of FIG. 10, the placement surface of the roller portion 16 is located below the conveying surface 6 of the entrance conveyor 1. Furthermore, the ascending of the placement surface of the roller portion 16 is performed by the elevation mechanism 32. In addition, as illustrated in FIG. 3, the pair of arm members 3a and 3b is rotated outward in the width direction by the air cylinder 4 so as to be opened, and hence a space for conveying the tire 11 is ensured on the conveying surface 6 of the entrance conveyor 1.

Then, as illustrated in FIG. 3, the belt conveyor servo motor 2 is rotated so as to drive the entrance conveyor 1, and hence the tire 11 that is input from the customer conveyor 10 to the entrance conveyor 1 is conveyed on the entrance conveyor 1 in the conveying direction at a comparatively slow constant conveying speed V. Then, the photoelectric sensor 8 at the upstream side of the entrance conveyor 1 detects the end (the rear end of the tire outer diameter) 12 farther from the test station 34 in the outer diameter of the tire 11. Then, a time T1 (s) at which the photoelectric sensor 8 detects the rear end 12 of the tire outer diameter is recorded.

Figure 5:
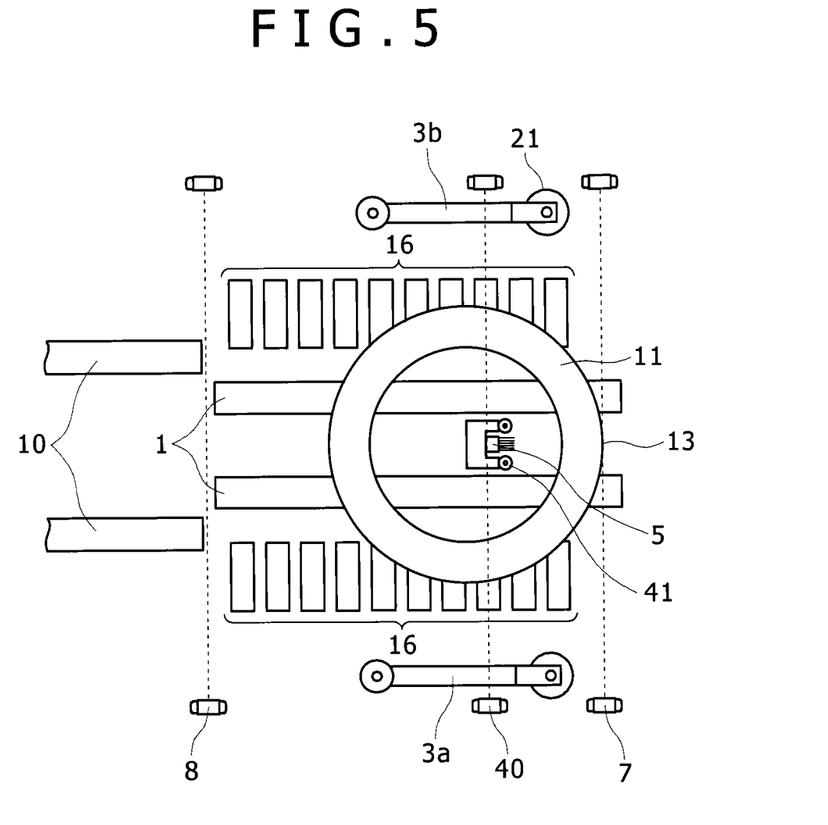
FIG. 5 is a top view illustrating a process in which the tire is conveyed by the tire conveyor according to this embodiment.

The tire 11 is directly conveyed on the entrance conveyor 1 at the constant conveying speed V in the conveying direction. Then, as illustrated in FIG. 5, when the downstream photoelectric sensor 7 detects the end (the front end of the tire outer diameter) 13 closer to the test station 34 in the outer diameter of the tire 11, the rotation of the belt conveyor servo motor 2 is first stopped, so that the conveying of the tire 11 by the entrance conveyor 1 is stopped and the time T2 (s) at which the photoelectric sensor 7 detects the front end 13 of the tire outer diameter.

At this time, when the time at which the photoelectric sensor 8 detects the rear end 12 is denoted by T1, the time at which the photoelectric sensor 7 detects the front end 13 is denoted by T2, the distance between two photoelectric sensors 7 and 8 is denoted by L (mm), and the conveying speed of the entrance conveyor 1 is denoted by V (mm/s), the conveying distance ΔL in which the tire 11 stops after the rear end 12 is detected by the photoelectric sensor 8 and then the front end 13 is detected by the photoelectric sensor 7 is calculated based on the following equation (1).

$$\Delta L = (T2 - T1) \times V \qquad (1)$$

Then, the tire outer diameter D is calculated by using the conveying distance ΔL obtained from the equation (1) based on the following equation (2).

$$D = L - \Delta L \qquad (2)$$

Furthermore, the conveying distance ΔL may be calculated from, for example, the relation between the number of pulses of an encoder attached to the belt conveyor servo motor 2 and a movement distance of the entrance conveyor 1 for each pulse. Specifically, the conveying distance ΔL may be obtained by a method in which the number of pulses is counted from the time T1 at which the upstream photoelectric sensor 8 detects the rear end of the tire 11 to the time T2 at which the downstream photoelectric sensor 7 detects the front end thereof, and the number of counted pulses is multiplied by the movement distance for each pulse.

Furthermore, the conveying speed of the tire 11 by the entrance conveyor 1 may not be constant, but may be changed gradually from the high speed to the low speed. For example, first, the tire 11 is conveyed at a comparatively fast conveying speed V1 until the front end 13 of the tire reaches the position of the photoelectric sensor 40. Subsequently, when the front end 13 of the tire reaches the position of the photoelectric sensor 40, the tire 11 is conveyed at a comparatively slow conveying speed V2. In this way, when the tire 11 is conveyed at a comparatively fast speed at the early time and is conveyed at a comparatively slow speed at the late time, the front end 13 of the tire may be accurately positioned to the photoelectric sensor 7 while the conveying time is reduced. This effect becomes outstanding in a case where the conveying distance of the tire 11 by the entrance conveyor 1 is fairly larger than the tire outer diameter D.

Further, when the conveying speed of the tire 11 by the entrance conveyor 1 is gradually changed from the high speed to the low speed, the tire outer diameter D may be calculated based on a conveying distance ΔL1 until the conveying speed of the tire 11 is decreased after the rear end 12 of the tire 11 is detected by the photoelectric sensor 8 and then the front end 13 thereof is detected by the photoelectric sensor 40. Specifically, when the time at which the photoelectric sensor 8 detects the rear end 12 is denoted by T1 and the time at which the photoelectric sensor 40 detects the front end 13 thereof is denoted by T3, the conveying distance ΔL1 is calculated based on the following equation (3) by the time T1, the time T3, and the conveying speed V1 (mm/s) of the entrance conveyor 1 before the front end 13 of the tire reaches the position of the photoelectric sensor 40.

$$\Delta L1 = (T3-T1) \times V1 \quad (3)$$

Then, the tire outer diameter D is calculated based on the following equation (4) by using the conveying distance ΔL1 obtained by the equation (3) and the distance L1 (mm) between two photoelectric sensors 8 and 40.

$$D = L1 - \Delta L1 \quad (4)$$

Furthermore, FIG. 3 illustrates a configuration in which the tire outer diameter D is substantially equal to the distance L1 between two photoelectric sensors 8 and 40, that is, the conveying distance ΔL1 is fairly short. Such a configuration may be employed, but in order to calculate the tire outer diameter D, the distance L1 between two photoelectric sensors 8 and 40 needs to be a value larger than the largest value of the tire outer diameter D.

Figure 6:
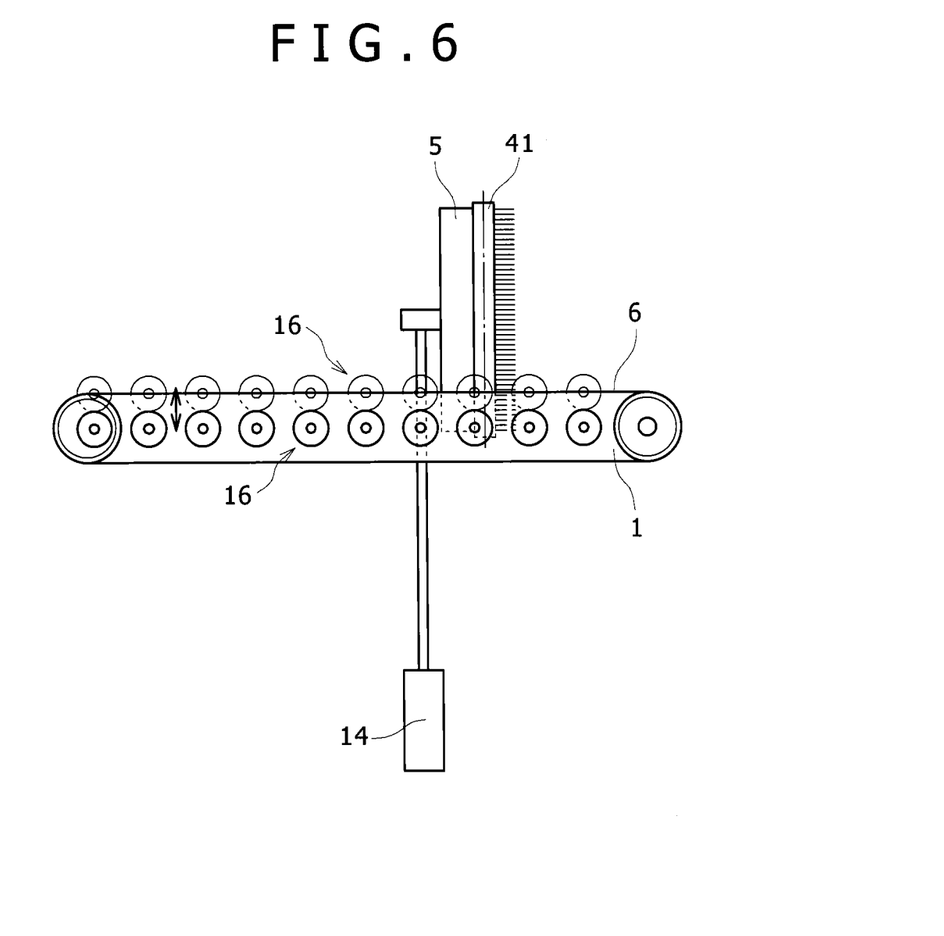
FIG. 6 is a side view illustrating the arrangement relation between the tire conveyor and the lubricator in the process of FIG. 5 in which the tire is conveyed by the tire conveyor according to this embodiment.

Here, as illustrated in FIG. 6, the air cylinder 14 is operated so that the lubricator 5 ascends so as to protrude from the conveying surface 6 of the entrance conveyor 1 and the placement surface of the roller portion 16 while the pair of arm members 3a and 3b to be described later presses the tire 11 toward the upstream side so that the tire contacts the lubricator 5 and the lubricator 5 is disposed at the position within the inner diameter of the tire 11 after the conveying of the tire 11 is stopped by the detection of the front end 13 of the tire 11 using the downstream photoelectric sensor 7. Furthermore, the tire 11 may be returned to the slightly upstream side by driving the entrance conveyor 1 before the operation of the arm members 3a and 3b. With such a configuration, the tire 11 may be further reliably pressed toward the lubricator 5 at the arm members 3a and 3b.

Further, as indicated by the dashed line of FIG. 10, when the elevation mechanism 32 drives the air cylinder 31, the placement surface of the roller portion 16 is caused to ascend from the conveying surface 6 of the entrance conveyor 1 through the link mechanism 33 so that the tire 11 is transferred from the entrance conveyor 1 to the roller portion 16. That is, the upper ends of the placement rollers of the roller portions 16 (the member rollers of the upper ends of the placement rollers in a case where the placement rollers are provided with the member rollers) are caused to ascend so as to be located above the conveying surface 6 of the entrance conveyor 1, and the tire 11 is transferred from the conveying surface 6 of the entrance conveyor 1 to the upper ends of the placement rollers of the roller portions 16 forming the placement surface.

Subsequently, the air cylinder 4 is driven so that the pair of arm members 3a and 3b rotates inward in the width direction so as to be closed, and the pair of arm members 3a and 3b presses the tire 11 placed on the roller portion 16 toward the upstream side by the pressing roller 21. Then, as illustrated in FIG. 7, the tire 11 approaches the lubricator 5 on the roller portion 16 while being pressed by the pair of arm members 3a and 3b, and hence the bead portion 15 of the tire (the inner periphery of the tire 11 illustrated in FIG. 8) contacts the lubricator 5.

Figure 7:
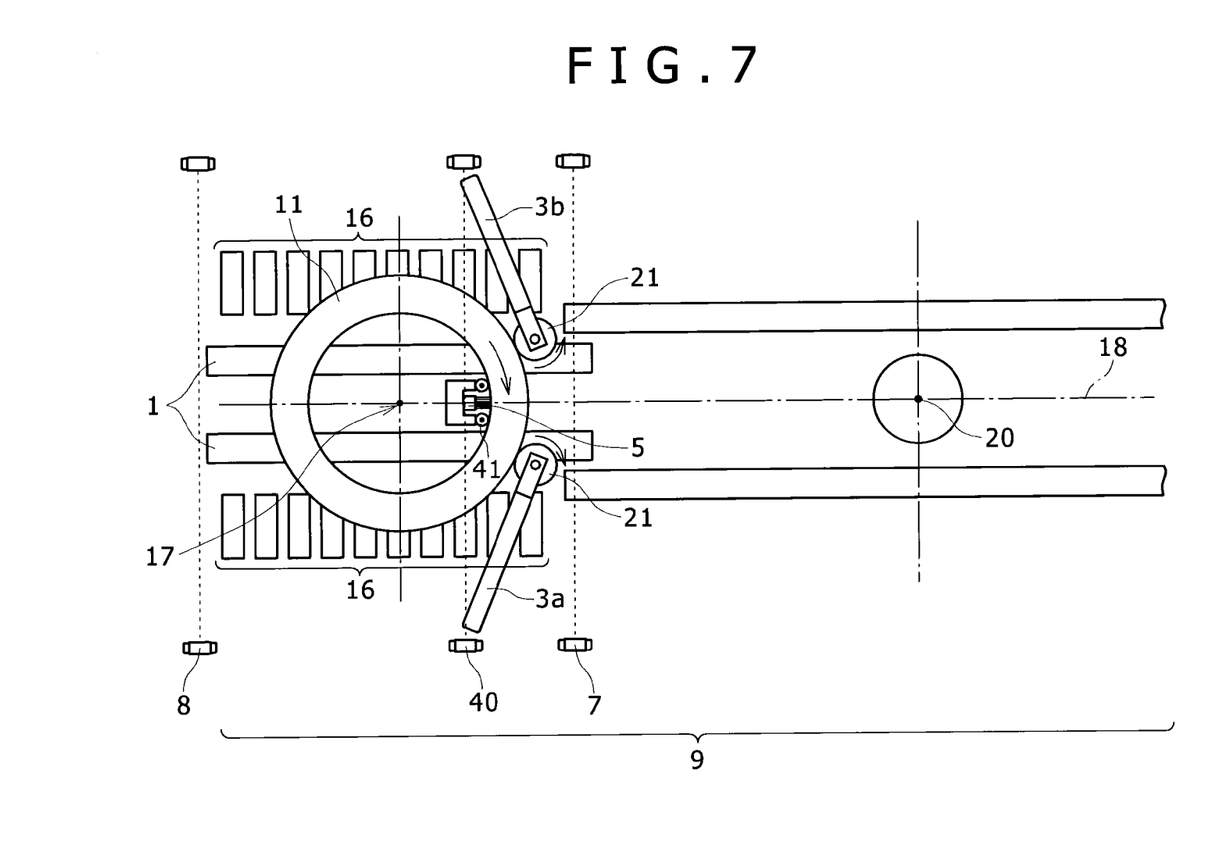
FIG. 7 is a top view illustrating a state where the lubricator applies lubricant to a bead portion of the tire on a roller portion in the tire conveyor according to this embodiment.
Figure 8:
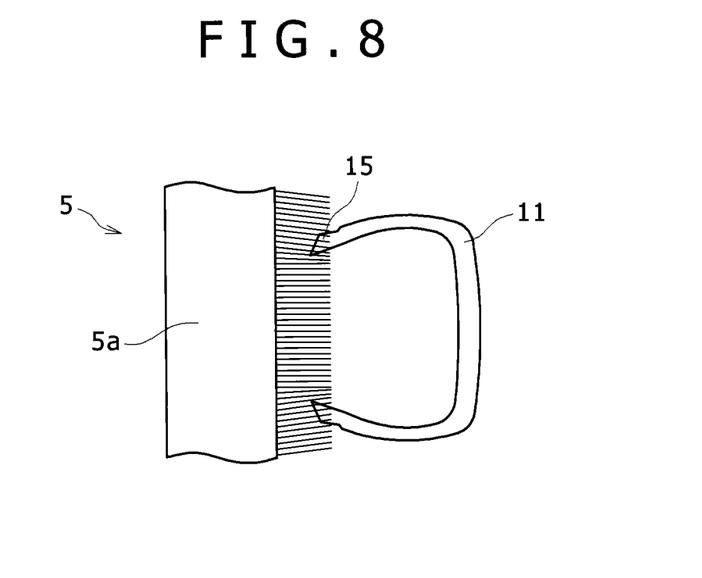
FIG. 8 is an enlarged cross-sectional view illustrating a brush of the lubricator of the tire conveyor according to this embodiment.

As illustrated in FIG. 7, one of the pressing rollers 21 attached to the front ends of the pair of arm members 3a and 3b is rotationally driven by the motor 22 in a state where the inner and outer peripheries of the tire 11 are pressed by the pressing roller 21 of one of the pair of arm members 3a and 3b and the lubricator 5. Accordingly, the tire 11 on the roller portions 16 rotates within the horizontal plane, and the brush 5a of the lubricator 5 applies a lubricant to the bead portion 15 of the tire 11 as illustrated in FIG. 8.

Figure 9:
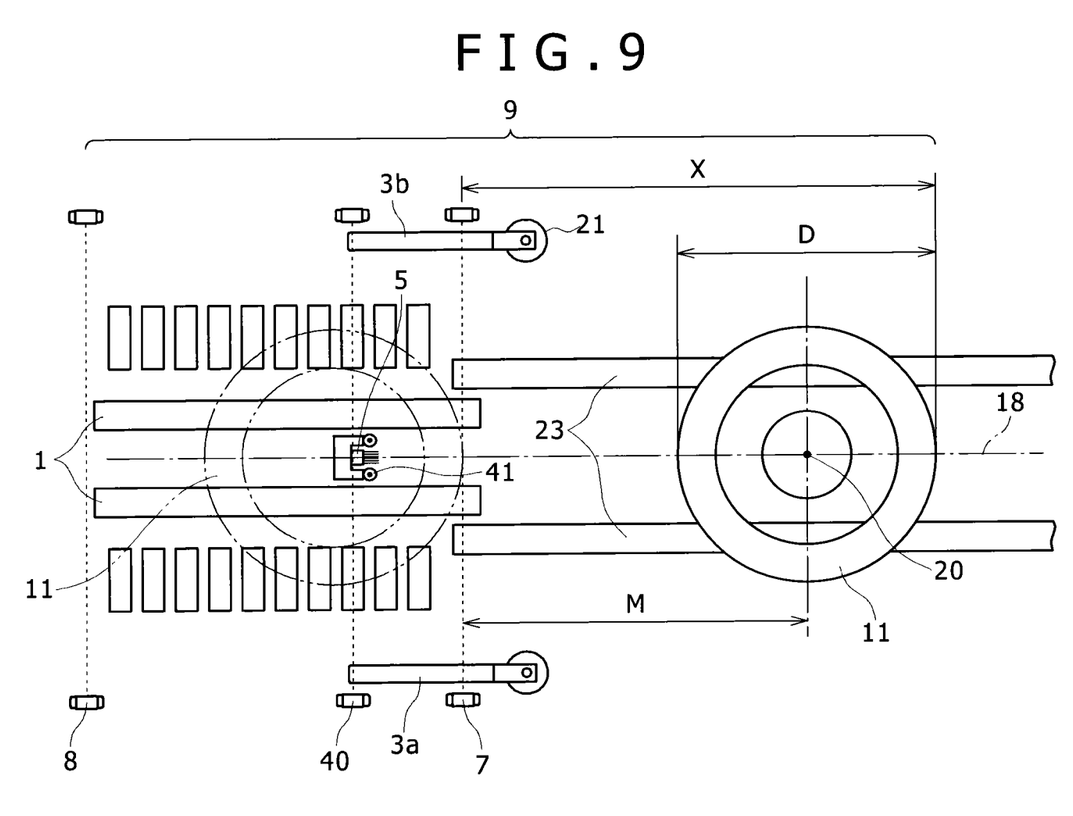
FIG. 9 is a top view illustrating a process in which the tire that is positioned at the front end thereof is sent to a spindle in the tire conveyor according to this embodiment.

Subsequently, as illustrated in FIG. 9, the air cylinder 4 is driven so that the pair of arm members 3a and 3b rotates outward in the width direction so as to be opened, and the pressing of the tire 11 using the pressing roller 21 is released. Subsequently, as indicated by the solid line of FIG. 10, when the air cylinder 31 of the elevation mechanism 32 is driven, the placement surface of the roller portion 16 is caused to descend from the conveying surface 6 of the entrance conveyor 1 through the link mechanism 33, and the tire 11 is transferred again from the placement surface of the roller portion 16 onto the conveying surface 6 of the entrance conveyor 1.

Then, the belt conveyor servo motor 2 is rotated so as to drive the entrance conveyor 1, and the tire 11 is conveyed again to the downstream side where the test station 34 exists. When the tire 11 slightly moves to the test station 34 by the entrance conveyor 1, the lubricator 5 that has applied the lubricant to the tire 11 is caused to descend by the air cylinder 14, and is returned to the standby position below the conveying surface 6 of the entrance conveyor 1 and the placement surface of the roller portion 16.

Then, as indicated by the dashed line of FIG. 9, the tire moves on the entrance conveyor 1 so as to be positioned at the position where the front end 13 of the tire 11 is detected by the photoelectric sensor 7. Accordingly, the front end 13 of the tire 11 that is positioned in the width direction of the entrance conveyor 1 is positioned at a predetermined position in the conveying direction of the entrance conveyor 1, that is, a certain specific position (a position indicated by the dashed line of FIG. 9) regardless of the outer diameter dimension of the tire 11.

Then, as indicated by the solid line of FIG. 9, the entrance conveyor 1 and the center conveyor 23 are driven in a synchronized manner, and the tire is conveyed until the rotation center (the tire shaft 17) of the tire 11 matches the spindle shaft 20 as the rotation center position of the bottom spindle 24 of the test station 34.

Here, the conveying distance X of the tire 11 that is conveyed on the entrance conveyor 1 while the front end 13 is positioned until the rotation center (the tire shaft 17) of the tire 11 matches the spindle shaft 20 is calculated based on the following equation (5) from the outer diameter dimension D of the tire 11 obtained by the above-described equation (2) or (4) and the distance M in the conveying direction from the previously measured position of the downstream photoelectric sensor 7 to the spindle shaft 20, that is, the distance M in the conveying direction from a predetermined position (a position indicated by the dashed line of FIG. 9) where the front end 13 of the tire 11 is positioned in the entrance conveyor 1 to the spindle shaft 20.

$$X = M + D/2 \quad (5)$$

Finally, the tire 11 that is conveyed to the test station 34 is interposed between the bottom spindle 24 and the top spindle 25 in a manner such that the ball screws 28a and 28b are driven so as to move the slide beam 26 upward and downward after the bead portion 15 is fitted to the rim member (not illustrated), and is attached to the bottom spindle 24 and the top spindle 25 in a reclined state. In this way, the tire is completely conveyed to the test station 34.

In this way, in the tire conveyor 9 of this embodiment, the elevation mechanism 32 includes the air cylinder 31 and the link mechanism 33 that connects the roller portion 16 and one air cylinder 31 to each other while supporting the frame 16b of the roller portion 16. Accordingly, the placement surface of the roller portion 16 may be moved upward and downward relative to the conveying surface 6 of the entrance conveyor 1 just by driving one air cylinder 31. For this reason, the roller portions 16 may be reliably and smoothly elevated without synchronizing the plurality of actuators, and hence the tire 11 may be stably transferred between the entrance conveyor 1 and the roller portions 16.

While the preferred embodiments of the present invention have been described, the present invention is not limited to the above-described embodiments, and various modifications may be made without departing from the scope of claims.

In the tire conveyor 9 according to the above-described embodiment, the sensors that detect the front end 13 and the rear end 12 of the tire 11 on the entrance conveyor 1 are configured as the non-contact type photoelectric sensors 7 and 8, but the sensors may be configured as different non-contact type sensors or contact type sensors.

In the tire conveyor 9 according to the above-described embodiment, the conveyor that sends the tire 11 to the test station 34 is configured as a belt conveyor, and is divided into two conveyors, that is, the entrance conveyor 1 and the center conveyor 23. However, the conveyor may be configured as one continuous belt conveyor or may be configured as a different conveyor other than the belt conveyor.

In the tire conveyor 9 according to the above-described embodiment, the member roller having the rotary shaft perpendicular to the rotary shaft of the placement roller 16a of the roller portion 16 is provided in the placement roller. However, if the tire may be rotatably placed, a free roller having a different structure may be used.

In the tire conveyor 9 according to the above-described embodiment, the reclined tire 11 is sent to the tire testing machine 35 to which the tire is attached in the reclined state, but an inverted tire may be sent to the tire testing machine to which the tire is attached in the inverted state.

In the tire conveyor 9 according to the above-described embodiment, the elevation mechanism 32 is attached to and supported by the frames 16b constituting the pair of roller portions 16, but may be attached to and supported by the frames of two entrance conveyors 1. In such a case, when the air cylinder 31 is expanded and contracted, the conveying surfaces of two entrance conveyors 1 are simultaneously moved upward and downward relative to the placement surface of the roller portion 16.

In the tire conveyor 9 according to the above-described embodiment, as illustrated in FIGS. 1 and 3 to FIGS. 7 and 9, the lubricator 5 may include a pair of positioning rollers 41 that contacts the inner periphery of the tire 11 so as to position the inner periphery (furthermore, the positioning rollers 41 may not be provided). Further, the outer peripheral surface of the tire 11 is pressed toward the center side by the pair of arm members 3a and 3b. However, a configuration may be employed in which a pair of second arm members having front ends directed to the upstream side and including pressing rollers is further provided in addition to the pair of arm members 3a and 3b and the outer peripheral surface of the rotating tire 11 is pressed toward the center side from four directions by the pair of arm members 3a and 3b and the pair of second arm members. In this case, when the tire 11 on the entrance conveyor 1 in the state of FIG. 5 needs to be interposed by the lubricator 5, the pair of arm members 3a and 3b, and the pair of second arm members, the belt conveyor servo motor 2 is rotated in the direction opposite to the conveying direction so that the tire 11 on the entrance conveyor 1 is conveyed at a slow constant conveying speed in the direction opposite to the conveying direction. Then, when the tire 11 is pressed to the position where the positioning roller of the ascending lubricator 5 contacts the inner periphery of the tire, the pair of arm members 3a and 3b and the pair of second arm members are rotated inward in the width direction so that the outer periphery of the tire 11 is pressed toward the center side by the respective pressing rollers of the pair of arm members 3a and 3b and the pair of second arm members.

What is claimed is:

1. A tire conveyor that conveys a tire to a center position of a spindle in a tire testing machine equipped with the spindle used to attach a test tire thereto, the tire conveyor comprising:
   a conveyor portion that includes a conveying surface that conveys the tire in a conveying direction;
   a roller portion that is provided, relative to a width direction perpendicular to the conveying direction, at a position without a conveying surface, the roller portion extending parallel to the conveying surface of the conveyor and being provided with a plurality of placement rollers forming a placement surface on which the tire is rotatably placed;
   an elevation mechanism that includes only one actuator provided at a location offset from a center of the placement surface in the conveying direction, and a link mechanism connecting the roller portion to the actuator at positions on opposite sides of the center of the placement surface in the conveying direction, such that the placement surface of the roller portion is moved upward and downward relative to the conveying surface of the conveyor by driving of the actuator;
   a tire rotation member provided at a predetermined position in the conveying direction and that rotates the tire placed on the roller portion; and
   a lubricator that applies a lubricant to a bead portion of the inner periphery of the tire rotated by the tire rotation member.

2. The tire conveyor according to claim 1, wherein the actuator is an air cylinder.

3. A tire conveyor that conveys a tire to a center position of a spindle in a tire testing machine equipped with the spindle used to attach a test tire thereto, the tire conveyor comprising:
   a conveyor portion that includes a conveying surface that conveys the tire in a conveying direction;
   a roller portion that extends in parallel to the conveying direction and that is located adjacent to the conveying surface of the conveyor portion in a transverse direction that is perpendicular to the conveying direction, the roller portion including a plurality of placement rollers forming a placement surface on which the tire is rotatably placed;
   an elevation mechanism that includes only one actuator provided at a location offset from a center of the placement surface in the conveying direction, the actuator being coupled to a swing link mechanism, the swing link mechanism swingably connected to either the roller portion or the conveyor portion at positions on opposite sides of the center of the placement surface in the conveying direction, such that driving the only one actuator swings the swing link mechanism in both a vertical and horizontal direction and thereby moves the placement surface of the roller portion upward and downward relative to the conveying surface of the conveyor portion or moves the conveying surface of the conveyor portion upward and downward relative to the placement surface of the roller portion;
   a tire rotation member provided at a predetermined position in the conveying direction and that rotates the tire placed on the roller portion; and a lubricator that applies a lubricant to a bead portion of the inner periphery of the tire rotated by the tire rotation member.

4. The tire conveyor according to claim 3, wherein the actuator is an air cylinder.

5. The tire conveyor according to claim 3, wherein the swing link mechanism includes a first rotary link and a second rotary link that couple the swing link mechanism to either the roller portion or the conveyor portion.

6. The tire conveyor according to claim 5, wherein the first and second rotary links are respectively disposed at front and rear support portions, respectively, of either the roller portion or the conveyor portion, the front and rear support portions extending downward at front and rear sides of either the roller portion or the conveyor portion in the conveying direction.

7. The tire conveyor according to claim 3, wherein the elevation mechanism includes two swing link mechanisms that are both operated by the only one actuator.

* * * * *